(12) United States Patent
Gurvich et al.

(10) Patent No.: US 10,935,068 B2
(45) Date of Patent: Mar. 2, 2021

(54) DESIGNS AND METHODS OF MAKING OF JOINTS FOR COMPOSITE COMPONENTS UNDER DOMINANT BENDING LOAD

(71) Applicant: GOODRICH CORPORATION, Charlotte, NC (US)

(72) Inventors: Mark R. Gurvich, Middletown, CT (US); Georgios S. Zafiris, Glastonbury, CT (US); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 724 days.

(21) Appl. No.: 15/815,114

(22) Filed: Nov. 16, 2017

(65) Prior Publication Data

US 2019/0145448 A1    May 16, 2019

(51) Int. Cl.
  *B29C 43/02*    (2006.01)
  *F16C 3/02*    (2006.01)
  *F16D 1/072*    (2006.01)

(52) U.S. Cl.
  CPC .............. *F16C 3/026* (2013.01); *B29C 43/02* (2013.01); *F16D 1/072* (2013.01); *Y10T 403/49* (2015.01)

(58) Field of Classification Search
  CPC ......... B29C 43/02; B29C 57/02; B29C 57/10; B29C 65/56; B29C 65/567; B29C 65/568; B29C 66/70; B29C 66/71; B29C 66/712; B29C 66/74; B29C 66/742; B29L 2031/06; B29L 2031/24; F16B 7/02; F16B 17/004; F16C 3/023; F16C 3/026; F16D 1/072; F16D 1/08; F16D 1/0852; Y10T 403/49; Y10T 403/4958; Y10T 403/7064; Y10T 403/7073

USPC ....... 403/274, 281, 374.1, 375; 464/181–183
See application file for complete search history.

(56) References Cited

U.S. PATENT DOCUMENTS

| | | | | |
|---|---|---|---|---|
| 4,238,540 | A * | 12/1980 | Yates | ............. F16C 3/026 156/172 |
| 4,279,275 | A * | 7/1981 | Stanwood | ............. F16C 3/026 464/181 |
| 4,353,268 | A | 10/1982 | Picard et al. | |
| 7,731,593 | B2 | 6/2010 | Dewhirst et al. | |
| 8,720,358 | B2 * | 5/2014 | Kuhlmann | ............. F16C 3/026 114/162 |
| 9,056,431 | B2 * | 6/2015 | Bond | ............. B29C 70/30 |

(Continued)

FOREIGN PATENT DOCUMENTS

| | | | | |
|---|---|---|---|---|
| DE | 871230 | C * | 3/1953 | ....... E04B 1/5843 |
| DE | 102007051517 | A1 * | 4/2009 | ....... B29C 70/865 |

(Continued)

OTHER PUBLICATIONS

European Patent Office, European Search Report dated Mar. 22, 2019 in Application No. 18205239.9.

*Primary Examiner* — Josh Skroupa
(74) *Attorney, Agent, or Firm* — Snell & Wilmer, L.L.P.

(57) ABSTRACT

A composite tube joint may comprise an end of a composite tube, an inner member disposed within the end, wherein an outer surface of the inner member has a complementary shape to an inner surface of the end, an outer member concentrically surrounding the end of the composite tube, and an undulated surface configured to mitigate movement of the end of the composite tube relative to at least one of the inner member and the outer member.

18 Claims, 11 Drawing Sheets

(56) References Cited

U.S. PATENT DOCUMENTS

| | | | | |
|---|---|---|---|---|
| 9,217,463 B2 * | 12/2015 | Oessenich | ............... | F16C 3/026 |
| 9,956,987 B2 * | 5/2018 | Kunishima | ............. | F16C 3/026 |
| 2012/0163905 A1 | 6/2012 | Bond et al. | | |

FOREIGN PATENT DOCUMENTS

| | | | | | |
|---|---|---|---|---|---|
| EP | 0270484 | | 6/1988 | | |
| GB | 2051303 | | 1/1981 | | |
| JP | 63199914 | A * | 8/1988 | ............... | F16C 3/026 |
| JP | 03288012 | A * | 12/1991 | .......... | B29C 66/534 |
| JP | 2000120649 | | 4/2000 | | |
| RU | 2340803 | | 12/2008 | | |
| SU | 1742090 | A1 * | 6/1992 | ......... | B29C 37/0082 |
| WO | 2016180901 | | 11/2016 | | |

* cited by examiner

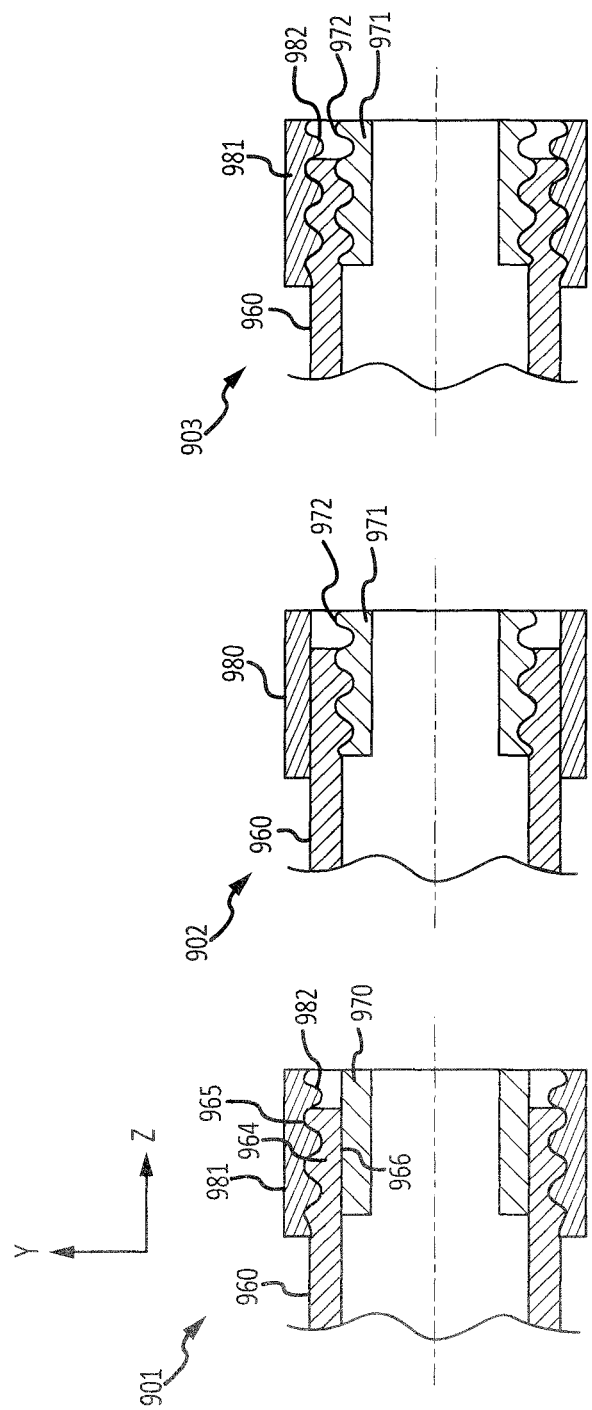

DESIGNS AND METHODS OF MAKING OF JOINTS FOR COMPOSITE COMPONENTS UNDER DOMINANT BENDING LOAD

FIELD

The present disclosure relates generally to joints, and more specifically to joints having composite components.

BACKGROUND

Landing gear composite components may be designed as composite cylindrical elements with a tubular shape. Typical composite material comprises, but not limited to polymer matrix composite, or other hybrid material. These components may undergo complex conditions including axial, torsional, and bending loads. Typical wedge joint designs utilized primarily to handle and transfer axial loads may be associated with a risk of excessive slipping between the composite tube and the metallic or composite wedge parts when exposed to bending loads, leading to potentially severe stress re-distribution and risk of damage or tube/joint separation.

SUMMARY

A composite tube joint is disclosed, comprising an end of a composite tube, an inner member disposed within the end, wherein an outer surface of the inner member has a complementary shape to an inner surface of the end, an outer member concentrically surrounding the end of the composite tube, and a first undulated surface configured to mitigate movement of the end relative to at least one of the inner member and the outer member.

In various embodiments, the first undulated surface is disposed on the outer surface of the inner member, the first undulated surface configured to physically restrict the end from moving relative to the inner member.

In various embodiments, the composite tube joint further comprises a second undulated surface disposed on an inner surface of the outer member, the second undulated surface configured to physically restrict the end from moving relative to the outer member.

In various embodiments, the first undulated surface is disposed on an inner surface of the outer member, the first undulated surface configured to physically restrict the end from moving relative to the outer member.

In various embodiments, the first undulated surface comprises a plurality of undulations oriented in a hoop direction.

In various embodiments, the end is compressed between the outer member and the inner member, and the first undulated surface is configured to physically restrict the end from moving relative to at least one of the inner member and the outer member in response to a bending moment being applied to the composite tube joint.

In various embodiments, the inner member comprises at least one of a first metallic material or a first composite material, and the outer member comprises at least one of a second metallic material or a second composite material.

In various embodiments, the outer surface of the inner member engages the inner surface of the end.

In various embodiments, the inner surface of the outer member engages an outer surface of the end.

In various embodiments, the end comprises a flared end, a converging end, a cylindrical end, or combinations thereof.

A composite tube joint is disclosed, comprising an end of a composite tube extending along a centerline axis, an inner member disposed within the end, wherein a shape of an outer surface of the inner member is complementary to an inner surface of the end, an outer member concentrically surrounding the end of the composite tube, wherein an inner surface of the outer member has a complementary shape to an outer surface of the end, and an undulated surface configured to mitigate movement of the end relative to at least one of the inner member and the outer member.

In various embodiments, the undulated surface comprises a first plurality of undulations concentrically surrounding the centerline axis and oriented in a hoop direction.

In various embodiments, the undulated surface comprises a first plurality of undulations surrounding the centerline axis and oriented at a first non-zero angle with respect to a hoop direction.

In various embodiments, the undulated surface comprises a second plurality of undulations surrounding the centerline axis and oriented at a second non-zero angle with respect to the hoop direction.

A method for forming a composite tube joint is disclosed, comprising disposing at least one composite layer to concentrically surround an inner member, disposing an outer member to concentrically surround an end of the composite layer, compressing the at least one composite layer between the inner member and the outer member, and forming an undulated surface on the composite layer in response to the compressing.

In various embodiments, the undulated surface is formed on an inner surface of the composite layer in response to an undulated outer surface of the inner member engaging the composite layer in response to the compressing.

In various embodiments, the undulated surface is formed on an outer surface of the composite layer in response to an undulated inner surface of the outer member engaging the composite layer in response to the compressing.

In various embodiments, a second undulated surface is formed on an inner surface of the composite layer in response to an undulated outer surface of the inner member engaging the composite layer in response to the compressing.

In various embodiments, the method further comprises removing the outer member from the composite layer.

In various embodiments, the method further comprises removing the inner member from the composite layer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 10A illustrates a composite tube joint having an outer member with an undulated inner surface, in accordance with various embodiments;

FIG. 10B illustrates a composite tube joint having an inner member with an undulated outer surface, in accordance with various embodiments;

FIG. 10C illustrates a composite tube joint having an outer member with an undulated inner surface and an inner member with an undulated outer surface, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes composite components having at least one end of a composite tube and at least one composite tube joint formed thereon. The composite tube joint may include an end of the composite tube, an inner member, and an outer member. The inner member and the outer member may be made from a material including, but not limited to, metals, composites, ceramics, wood, polymers, and glass. A composite may comprise a polymer matrix composite. The composite may comprise a polymer matrix composite reinforced by fibers such as a carbon, glass, organic fibers, or combinations thereof. Such composite tube joints may be used in aircraft systems, such as, for example, landing gear systems. However, the systems and methods of the present disclosure may be suitable for use in non-aircraft systems as well.

A composite tube joint of the present disclosure may include an end of a composite tube, an inner member, and an outer member. A composite tube joint may experience bending loads. Composite tube joints having undulated surfaces, of the present disclosure, may mitigate slipping of the composite tube with respect to an inner member and/or an outer member of the composite tube joint.

In various embodiments, a composite tube joint of the present disclosure may be useful for various components including, but not limited to, linkages, connecting rods, actuator rods, struts, and structural supports.

Figure 1:
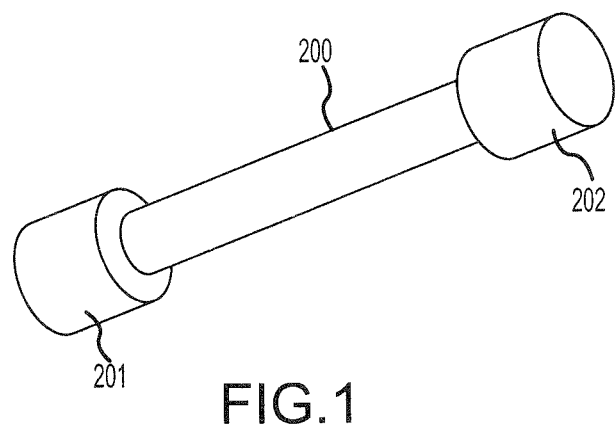
FIG. 1 illustrates a composite component comprising a composite tube having joints at the ends thereof, in accordance with various embodiments.
Figure 2:
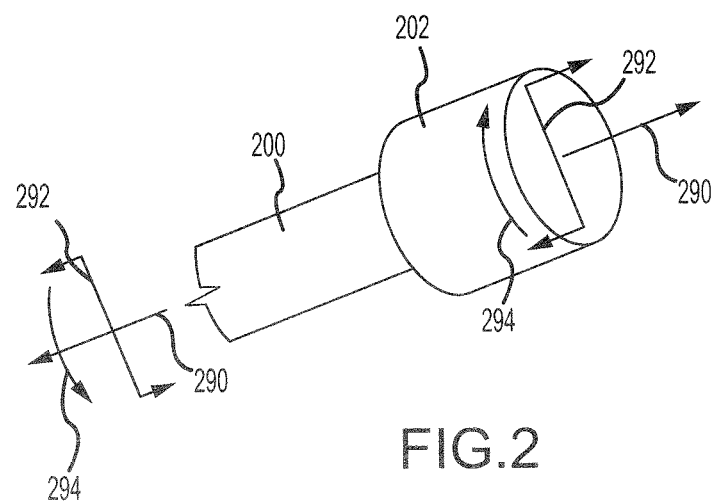
FIG. 2 illustrates a composite tube joint under axial loading, torsional loading, and a bending moment, in accordance with various embodiments.

With reference to FIG. 1, a schematic view of a composite tube joint 201 and a composite tube joint 202 are illustrated, in accordance with various embodiments. Composite tube joint 201 and composite tube joint 202 may be disposed at either end of a composite tube 200. Although illustrated as having a composite tube joint 201 at a first end and a composite tube joint 202 at a second end, it is contemplated herein that composite tube 200 may comprise only one composite tube joint 201. With additional reference to FIG. 2, composite tube joint 202 may experience an axial load, represented by arrow 290. The axial load may be a tensile load or a compressive load. Composite tube joint 202 may experience a bending moment, represented by arrow 292. Composite tube joint 202 may experience a torque load, represented by arrow 294.

Figure 3A:
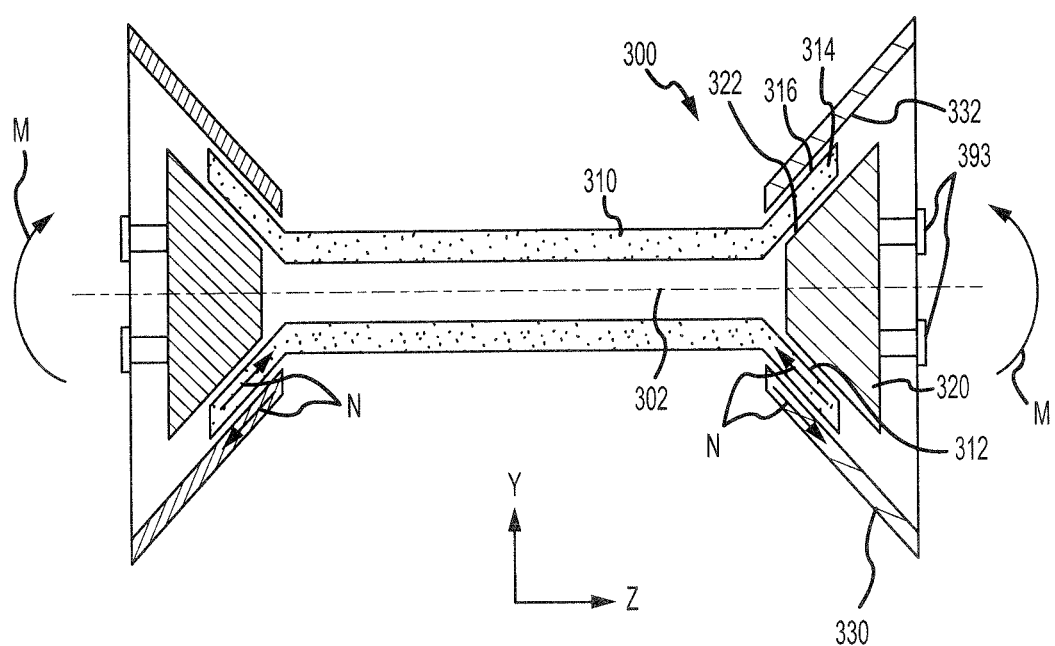
FIG. 3A illustrates a composite tube joint having a composite tube comprising flared ends, in accordance with various embodiments.

With reference to FIG. 3A, a composite tube joint 300 is illustrated, in accordance with various embodiments. Composite tube joint 300 may include an end of composite tube 310, an inner member 320, and an outer member 330. Composite tube 310 may extend along a centerline axis 302. In various embodiments, composite tube 310, inner member 320, and outer member 330 may be concentric with respect to centerline axis 302. Composite tube 310 may comprise a composite material, such as a polymer matrix composite for example. Inner member 320 and outer member 330 may comprise a metallic material or a composite material. Inner member 320 and outer member 330 may comprise a polymer matrix composite. Composite tube 310 may comprise an end (also referred to herein as a flared end) 314. In various embodiments, inner member 320 may be positioned within flared end 314. Flared end 314 may comprise a frustoconical geometry. Inner member 320 may comprise a frustoconical geometry. The geometry of inner member 320 may be complementary to the geometry of flared end 314. Inner member 320 may be positioned within flared end 314 and held under compression by components located outside of composite tube 310. As will be discussed in greater detail, in various embodiments, inner member 320 may be placed within flared end 314 during formation of composite tube 310 and flared end 314. In various embodiments, inner member 320 may be placed within flared end 314 after formation of composite tube 310 and flared end 314.

Inner member 320 may comprise an outer surface 322. Outer surface 322 may engage with flared end 314. In various embodiments, outer surface 322 may engage with an inner surface 312 of composite tube 310. Inner member 320 may be configured to be pushed into (in the negative z-direction) composite tube 310 by components located outside of composite tube 310 (e.g., outer member 330). Flared end 314 may be compressed between inner member 320 and outer member 330.

Composite tube joint 300 may experience a bending moment M. For example, in the illustrated embodiment, outer member 330 may rotate in the counter-clockwise direction relative to composite tube 310. In this regard, outer surface 316 may slip (directions of the slip are represented by arrows N) relative to inner surface 332 in response to bending moment M.

In various embodiments, outer member 330 may be coupled to inner member 320 via one or more fasteners 393. Fastener 393 may comprise a bolt, for example. In various embodiments, fastener 393 may hold inner member 320 in compression with outer member 330.

Figure 3B:
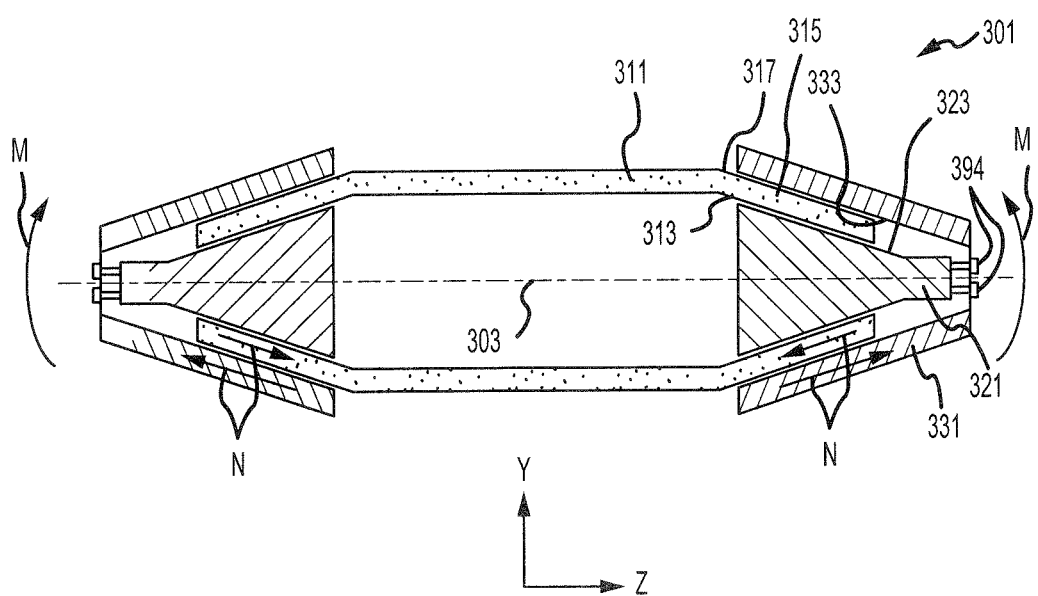
FIG. 3B illustrates a composite tube joint having a composite tube comprising converging ends, in accordance with various embodiments.

With reference to FIG. 3B, a composite tube joint 301 is illustrated, in accordance with various embodiments. Composite tube joint 301 may include an end of a composite tube 311, an inner member 321, and an outer member 331. Composite tube 311 may extend along a centerline axis 303. In various embodiments, composite tube 311, inner member 321, and outer member 331 may be concentric with respect to centerline axis 303. Composite tube joint 301 may be similar to composite tube joint 300 except that composite tube 311 comprises an end (also referred to herein as a converging end) 315, instead of a flared end 314, with momentary reference to FIG. 3A. In this regard, an outer surface 323 of inner member 321 may comprise a geometry which is complementary to the geometry of an inner surface 313 of converging end 315, an inner surface 333 of outer member 331 may comprise a geometry which is complementary to the geometry of an outer surface 317 of converging end 315.

Composite tube joint 301 may experience a bending moment M. For example, in the illustrated embodiment, inner member 321 may move in the counter-clockwise direction relative to composite tube 311. In this regard, inner surface 333 may slip relative to outer surface 317 in response to bending moment M. Similarly, outer surface 323 may slip relative to inner surface 313, in response to bending moment M.

In various embodiments, outer member 331 may be coupled to inner member 321 via one or more fasteners 394. Fasteners 394 may comprise a bolt, for example. In various embodiments, fasteners 394 may hold inner member 321 in compression with outer member 331.

With respect to FIG. 4A through FIG. 9C, embodiments of a composite tube joint are illustrated, in accordance with various embodiments, with respect to a composite tube having a flared end. It is contemplated herein that similar embodiments may be used for a composite tube joint having a composite tube with a converging end. Furthermore, it is contemplated herein that a composite tube joint of the present disclosure may comprises a composite tube having a combination of a flared end and converging end, for example, having an end that increases in diameter and then decreases in diameter along a direction. Furthermore, although described with respect to an inner member, the undulations described in FIG. 4A through FIG. 9C may be equally applicable to an outer member as well.

Figures 4A, 4B, 4C:
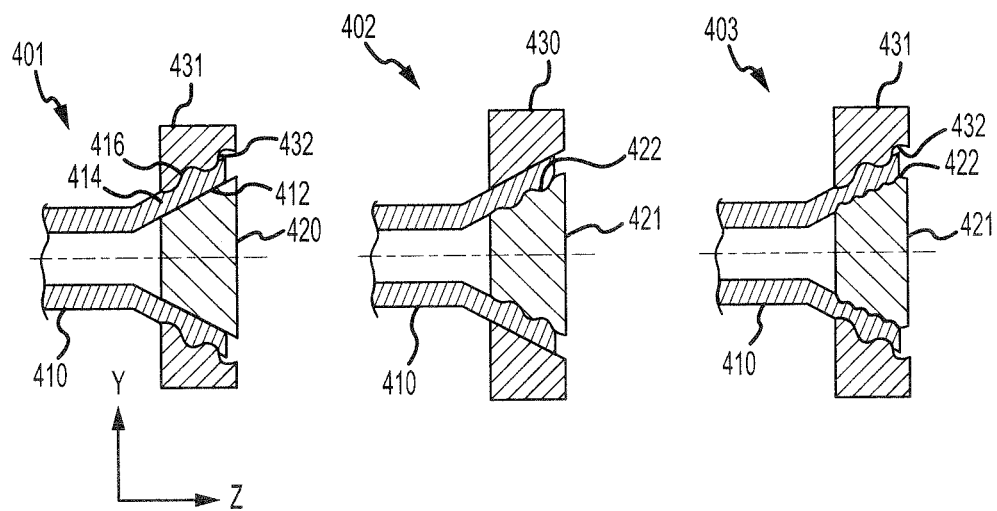
FIG. 4A illustrates a composite tube joint having an outer member with an undulated inner surface, in accordance with various embodiments.
FIG. 4B illustrates a composite tube joint having an inner member with an undulated outer surface, in accordance with various embodiments.
FIG. 4C illustrates a composite tube joint having an outer member with an undulated inner surface and an inner member with an undulated outer surface, in accordance with various embodiments.

With respect to FIG. 4A, FIG. 4B, and FIG. 4C, elements with like element numbering are intended to be the same and will not necessarily be repeated for the sake of clarity.

With reference to FIG. 4A, composite tube joint 401 is illustrated, in accordance with various embodiments. Composite tube joint 401 may include an end of a composite tube 410, an inner member 420, and an outer member 431. In various embodiments, outer member 431 may comprise an undulated inner surface 432.

With reference to FIG. 4B, composite tube joint 402 is illustrated, in accordance with various embodiments. Composite tube joint 402 may include an end of a composite tube 410, an inner member 421, and an outer member 430. In various embodiments, inner member 421 may comprise an undulated outer surface 422.

With reference to FIG. 4C, composite tube joint 403 is illustrated, in accordance with various embodiments. Composite tube joint 403 may include composite tube 410, inner member 421, and outer member 431.

With reference to FIG. 4A, composite tube joint 401 is illustrated in a compressed position, in accordance with various embodiments. Flared end 414 of composite tube 410 may be compressed between inner member 420 and outer member 431 (e.g., in response to inner member 420 moving in the negative Z-direction with respect to outer member 431, and/or in response to outer member 431 moving in the positive Z-direction with respect to inner member 420). Outer surface 416 of flared end 414 may become deformed in response to flared end 414 being compressed between outer member 431 and inner member 420. Stated differently, the geometry of outer surface 416 may become complementary to undulated inner surface 432 in response to flared end 414 being compressed between outer member 431 and inner member 420. In this regard, outer surface 416 may comprise an undulated surface in response to flared end 414 being compressed between outer member 431 and inner member 420. It should be appreciated that inner surface 412 may similarly deform in accordance with the geometry of inner member 420. Thus, inner surface 412 may comprise an undulated surface in response to flared end 414 being compressed between outer member 431 (or outer member 430) and inner member 421, with momentary reference to FIG. 4B. In this regard, flared end 414 may comprise an undulated outer surface 416 and a smooth inner surface 412, for example using the composite tube joint 401 (see FIG. 4A). Furthermore, flared end 414 may comprise an undulated inner surface 412 and a smooth outer surface 416, for example using the composite tube joint 402 (see FIG. 4B). Furthermore, flared end 414 may comprise both an undulated outer surface 416 and an undulated inner surface 412, for example using the composite tube joint 403 (see FIG. 4C).

In various embodiments, inner member 320 may be similar to inner member 420, with combined reference to FIG. 3A and FIG. 4A. In various embodiments, inner member 320 may be similar to inner member 421, with combined reference to FIG. 3A and FIG. 4B.

Figures 5A, 5B, 5C:
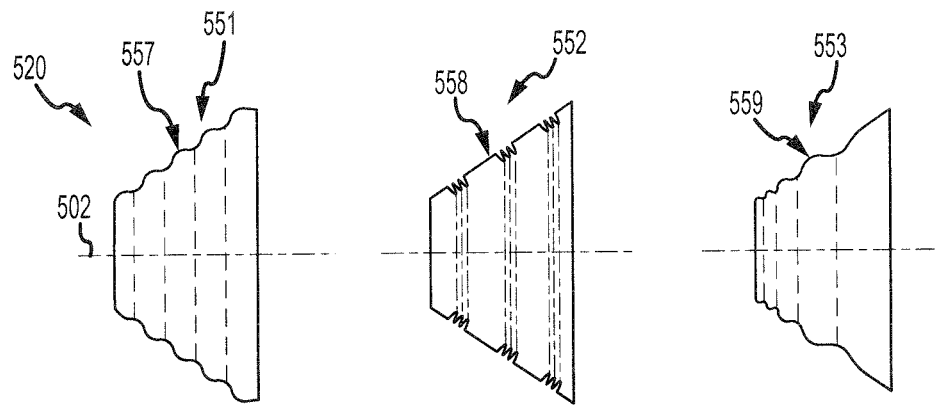
FIGS. 5A, 5B, and FIG. 5C illustrate inner members having undulated surfaces with various undulation patterns, in accordance with various embodiments.

With reference to FIG. 5A, undulations 551 are illustrated, in accordance with various embodiments. Undulations 551 may comprise a plurality of periodically displaced waves 557. Undulations 551 may be oriented in the hoop direction. In various embodiments, undulations 551 may be oriented perpendicular with respect to centerline axis 502. Orienting undulations 551 perpendicular with respect to centerline axis 502 may mitigate slipping between inner member 520 and an adjacent member (e.g., composite tube 410, see FIG. 4B) in response to a bending moment being applied to inner member 520 (e.g., as described with respect to FIG. 3A and FIG. 3B). Stated differently, undulations 551 may physically restrict inner member 520 from slipping relative to composite tube 410 in response to bending moment M, with momentary reference to FIG. 3A and FIG. 3B.

With reference to FIG. 5B, undulations 552 are illustrated, in accordance with various embodiments. Undulations 552 may comprise groupings of waves 558, each group spaced apart from the adjacent group.

With reference to FIG. 5C, undulations 553 are illustrated, in accordance with various embodiments. Undulations 553 may comprise a plurality of non-periodically displaced waves 559.

Although illustrated as an inner member, it is contemplated herein that the features described with respect to FIGS. 5A through 5C may similarly apply to an outer member.

Figures 6A, 6B:
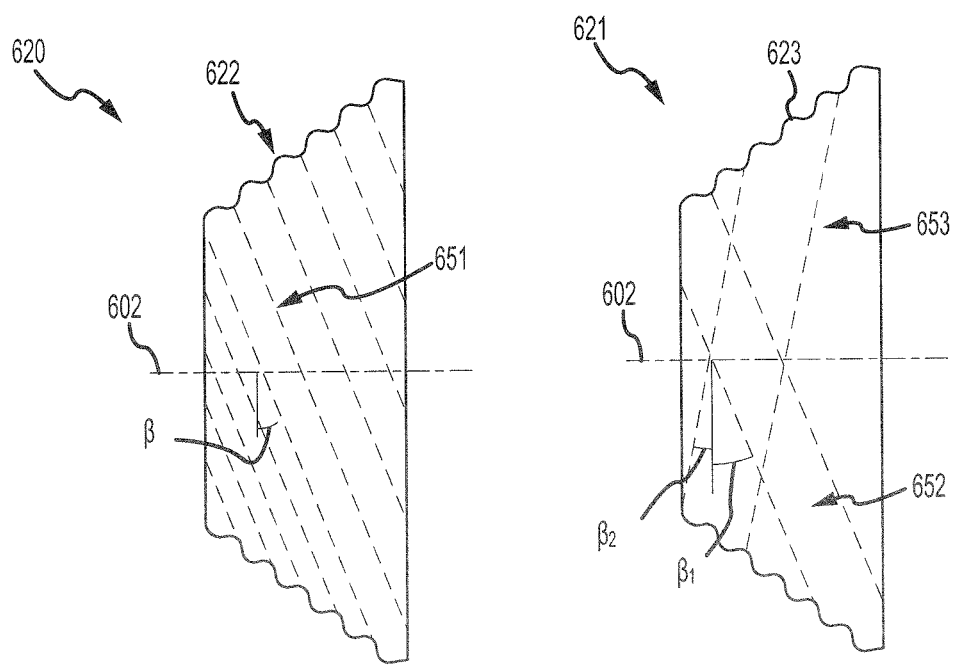
FIG. 6A and FIG. 6B illustrate inner members having undulations oriented at an angle with respect to the hoop direction of the inner member, in accordance with various embodiments.

With reference to FIG. 6A, an inner member 620 comprising an undulated outer surface 622 is illustrated, in accordance with various embodiments. Although illustrated as inner member 620, it is contemplated herein that the features described with respect to FIGS. 6A through 6B may similarly apply to an outer member. Undulations 651 may be oriented at an angle different than ninety degrees with respect to centerline axis 602. Stated differently, undulations 651 may be oriented at a non-zero angle $\beta$ with respect to the hoop direction (i.e., the tangential direction with respect to centerline axis 602). Orienting undulations 651 at angle $\beta$ with respect to the hoop direction may mitigate slipping of inner member 620 with respect to an adjacent member (e.g., composite tube 410, see FIG. 4B) in response to a torque being applied to inner member 620. Stated differently, undulations 651 may physically restrict inner member from rotating about centerline axis 602 with respect to composite tube 410. In various embodiments, angle $\beta$ may be variable along centerline axis 602.

In various embodiments, with combined reference to FIG. 6A and FIG. 4A, when angle $\beta$ is zero, undulations 651 may be optimal for helping mitigate movement of the inner member in the Z-direction relative to the composite tube (e.g., inner member 420 from moving relative to flared end 414), in response to a bending moment applied to the inner member. When angle $\beta$ is ninety degrees, undulations 651 may be optimal for helping mitigate movement of the inner member relative to the composite tube (e.g., inner member 420 from moving relative to flared end 414) in response to a torque applied to the inner member. Thus, angle $\beta$ may be chosen according to a predetermined ratio, or a range of such ratios, of moment and torque being applied to the composite tube joint.

With reference to FIG. 6B, an inner member 621 comprising an undulated outer surface 623 is illustrated, in accordance with various embodiments. Undulated outer surface 623 may comprise a first plurality of undulations 652 oriented at an angle different than ninety degrees with respect to centerline axis 602 and a second plurality of undulations 653 oriented at an angle different than ninety degrees with respect to centerline axis 602. Stated differently, undulated outer surface 623 may comprise a first plurality of undulations 652 oriented at a non-zero angle $\beta_1$ with respect to the hoop direction and a second plurality of undulations 653 oriented at a non-zero angle $\beta_2$ with respect to the hoop direction. In this regard, first plurality of undulations 652 may overlap second plurality of undulations 653. In various embodiments, angle $\beta_1$ may be between zero and ninety degrees (0°-90°). In various embodiments, angle $\beta_2$ may be between zero and ninety degrees (0°-90°). In various embodiments, angle $\beta_1$ may be variable along centerline axis 602. In various embodiments, angle $\beta_2$ may be variable along centerline axis 602.

Figure 7A:
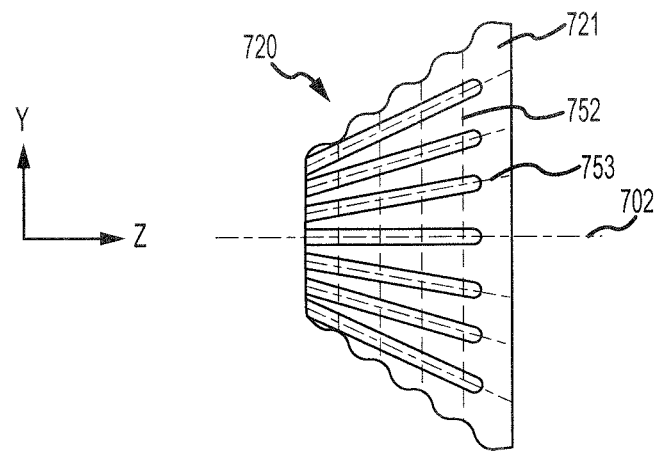
FIG. 7A illustrates an inner member having a first plurality of undulations oriented in the centerline direction and a second plurality of undulations oriented in the hoop direction, in accordance with various embodiments.
Figure 7B:
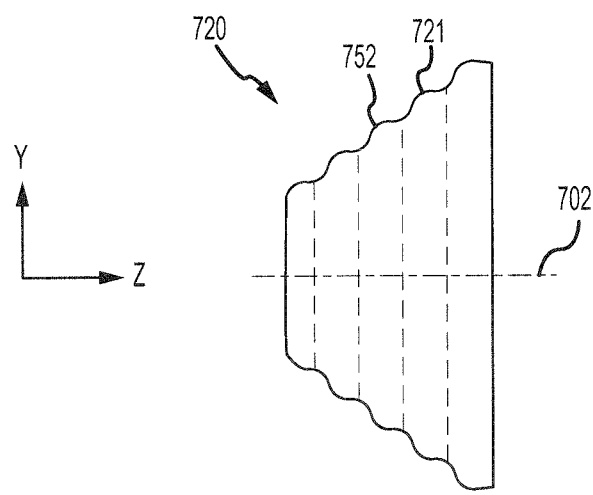
FIG. 7B illustrates a cross-sectional view of an inner member having a second plurality of undulations oriented in the hoop direction, in accordance with various embodiments.
Figure 7C:
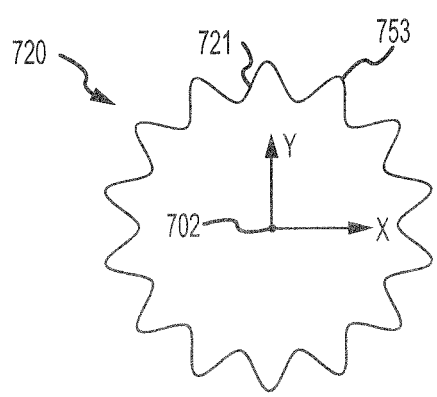
FIG. 7C, and FIG. 7D illustrate cross-sectional views, perpendicular to a centerline axis, of an inner member having a first plurality of undulations oriented in the centerline direction, in accordance with various embodiments.
Figure 7D:
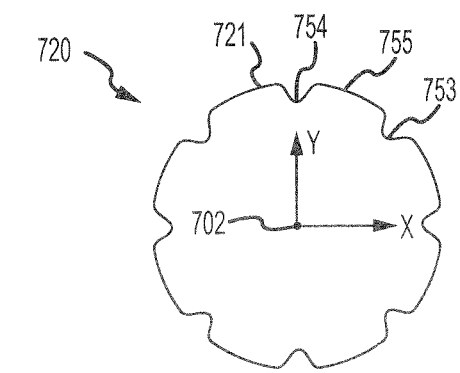

With reference to FIG. 7A, an inner member 720 comprising an undulated outer surface 721 is illustrated, in accordance with various embodiments. Undulated outer surface 721 may comprise a first plurality of undulations 752 oriented perpendicular with respect to centerline axis 702 and a second plurality of undulations 753 oriented perpendicular with respect to first plurality of undulations 752. First plurality of undulations 752 may circumferentially surround centerline axis 702. First plurality of undulations 752 may be oriented concentric with respect to centerline axis 702. Second plurality of undulations 753 may be defined by projections of centerline axis 702 onto undulated outer surface 721. In this regard, inner member 720 may resist both moments and torques. FIG. 7B illustrates a cross-section view of inner member 720 taken parallel to centerline axis 702. FIG. 7B may best illustrate a profile of first plurality of undulations 752. FIG. 7C illustrates a cross-section view of inner member 720 taken perpendicular to centerline axis 702, in accordance with various embodiments. FIG. 7C may best illustrate a profile of second plurality of undulations 753. In various embodiments, plurality of undulations 753 may define a continuously wavy surface, as illustrated in FIG. 7C. However, it is contemplated herein that plurality of undulations 753 may define distinct channels 754 disposed circumferentially along a circular surface 755, as illustrated in FIG. 7D. Undulations 754 may be implemented through a subtractive manufacturing process. Undulations 754 may be implemented through an additive manufacturing process.

Figures 8A, 8B, 8C, 8D:
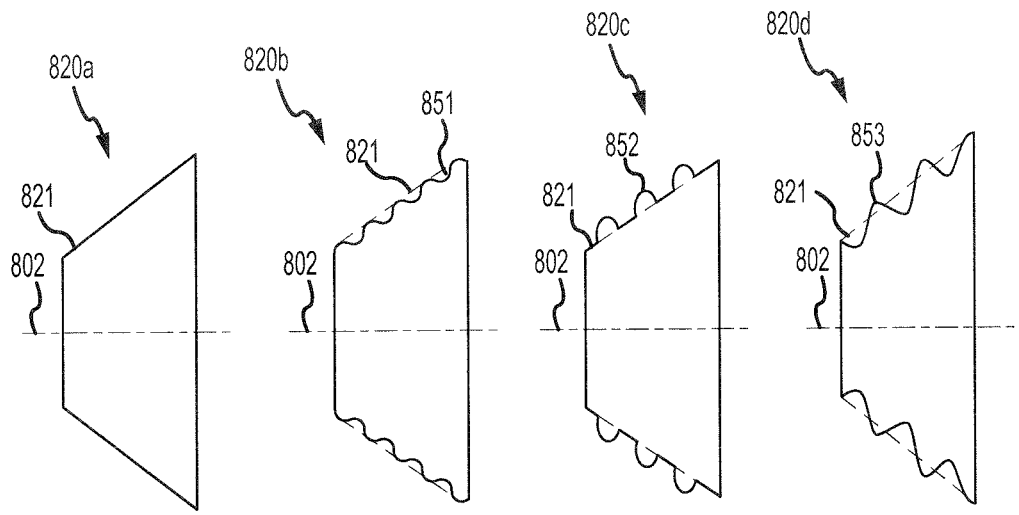
FIG. 8A illustrates an original (un-undulated) profile of an inner member, in accordance with various embodiments.
FIGS. 8B, 8C, and FIG. 8D illustrate the inner member of FIG. 8A after having undulations formed on the inner member via subtractive manufacturing, additive manufacturing, and a combination of additive and subtractive manufacturing, respectively, in accordance with various embodiments.

With reference to FIG. 8A, an inner member 820a is illustrated, in accordance with various embodiments. Inner member 820a may comprise an original profile 821 before undulations are formed onto inner member 820a. With combined reference to FIG. 8A and FIG. 8B, a plurality of undulations 851 may be formed into inner member 820a via a subtractive manufacturing process. In this regard, inner member 820b may be formed from inner member 820a by forming plurality of undulations 851 into inner member 820a via a subtractive manufacturing process. In this regard, plurality of undulations 851 may extend towards centerline axis 802 with respect to original profile 821.

With combined reference to FIG. 8A and FIG. 8C, a plurality of undulations 852 may be formed onto inner member 820a via an additive manufacturing process. In this regard, inner member 820c may be formed from inner member 820a by forming plurality of undulations 852 onto inner member 820a via an additive manufacturing process. In this regard, plurality of undulations 852 may extend away from centerline axis 802 with respect to original profile 821.

With combined reference to FIG. 8A and FIG. 8D, a plurality of undulations 853 may be formed onto inner member 820a via both an additive manufacturing process and a subtractive manufacturing process. In this regard, inner member 820d may be formed from inner member 820a by forming plurality of undulations 853 onto inner member 820a via both an additive manufacturing process and a subtractive manufacturing process. In this regard, plurality of undulations 853 may extend both towards centerline axis 802 and away from centerline axis 802 with respect to original profile 821.

Figure 9A:
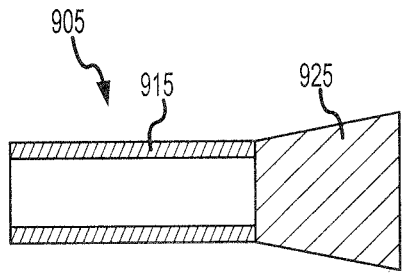
FIG. 9A illustrates a form for forming a composite tube, in accordance with various embodiments.
Figure 9B:
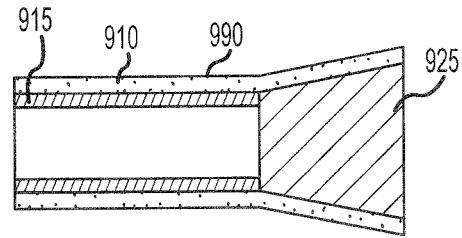
FIG. 9B illustrates the form for forming a composite tube of FIG. 9A with a composite layer disposed on the form, in accordance with various embodiments.
Figure 9C:
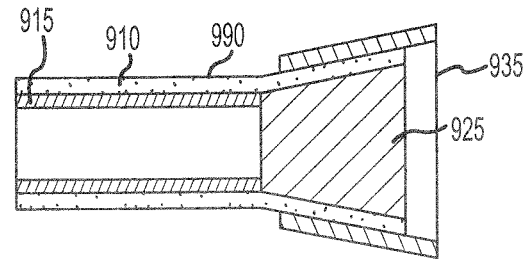
FIG. 9C illustrates the form for forming a composite tube with the composite layer disposed on the form of FIG. 9B with the composite layer compressed between an external end part and an internal end part, in accordance with various embodiments.

With combined reference to FIGS. 9A through FIG. 9C, a composite tube 910 may be formed by laying composite sheets or layers in a desired shape and bonding the layers together using resins, adhesives, or other bonding agents. In various embodiments, composite tube 910 may be formed using a fiber-wound fabrication process, wherein fiber is continuously wound onto a form and bonded together using resins, adhesives, or other bonding agents. Any manner of forming composite tube 910 is within the scope of the present disclosure. An exemplary form 905, comprising an internal liner 915 and an internal end part 925, for forming composite tube 910 is illustrated in FIG. 9A. In various embodiments, internal liner 915 may be made from a metal. In various embodiments, internal end part 925 may be made from a metal. Liner 915 and internal end part 925 may be made from a composite, ceramic, wood, or other material. Internal liner 915 and internal end part 925 may aid in maintaining a shape of composite tube 910 during a composite layup process. For example, a composite layup process may include spinning composite fibers around internal liner 915 and/or internal end part 925 and/or placing composite pre-preg sheets around internal liner 915 and/or internal end part 925 to form a composite layer 990. In various embodiments, the composite layup process may further include disposing an external end part 935 to surround composite layer 990. In various embodiments, composite layer 990 may be compressed between internal end part 925 and external end part 935. Undulations, such as those described herein with respect to FIGS. 4A through 8D may be disposed on the outer surface of internal end part 925 and/or the inner surface of external end part 935. Thus, undulations may be formed onto composite layer 990 as a result of the compression, similar to undulated outer surface 416 of FIG. 4A for example. In various embodiments, internal liner 915 and/or internal end part 925 may comprise a mandrel configured to be removed during the layup process (e.g., after the composite fibers are partially cured or fully cured). In various embodiments, internal liner 915 and/or internal end part 925 may remain within composite tube 910 after the composite layup process, for example to increase strength and/or stiffness properties of composite tube 910. In various embodiments, inner member 421 may be similar to internal end part 925, with momentary reference to FIG. 4B.

With respect to FIG. 10A, FIG. 10B, and FIG. 10C, elements with like element numbering are intended to be the same and will not necessarily be repeated for the sake of clarity. With reference to FIG. 10A, composite tube joint 901 is illustrated, in accordance with various embodiments. Composite tube joint 901 may include an end (also referred to herein as a cylindrical end) 964 of a composite tube 960, an inner member 970, and an outer member 981. Composite tube 960 may comprise the end 964. In various embodiments, composite tube 960, inner member 970, and outer member 981 may each comprise a cylindrical geometry. In various embodiments, outer member 981 ay comprise an undulated inner surface 982.

With reference to FIG. 10B, composite tube joint 902 is illustrated, in accordance with various embodiments. Composite tube joint 902 may include the end of a composite tube 960, an inner member 971, and an outer member 980. In various embodiments, inner member 971 may comprise an undulated outer surface 972.

With reference to FIG. 10C, composite tube joint 903 is illustrated, in accordance with various embodiments. Composite tube joint 903 may include the end of composite tube 960, inner member 971, and outer member 981.

With reference to FIG. 10A, composite tube joint 901 is illustrated in a compressed position, in accordance with various embodiments. End 964 of composite tube 960 may be compressed between inner member 970 and outer member 981 (e.g., in response to inner member 970 moving in the negative Z-direction with respect to outer member 981, and/or in response to outer member 981 moving in the positive Z-direction with respect to inner member 970). Outer surface 965 of end 964 may become deformed in response to end 964 being compressed between outer member 981 and inner member 970. Stated differently, the geometry of outer surface 965 may become complementary to undulated inner surface 982 in response to end 964 being compressed between outer member 981 and inner member 970. In this regard, outer surface 965 may comprise an undulated surface in response to end 964 being compressed between outer member 981 and inner member 970. It should be appreciated that inner surface 966 may similarly deform in accordance with the geometry of inner member 970. Thus, inner surface 966 may comprise an undulated surface in response to end 964 being compressed between outer member 981 (or outer member 980) and inner member 971, with momentary reference to FIG. 10B. In this regard, end 964 may comprise an undulated outer surface 965 and a smooth inner surface 966, for example using the composite tube joint 901 (see FIG. 10A). Furthermore, end 964 may comprise an undulated inner surface 966 and a smooth outer surface 965, for example using the composite tube joint 902 (see FIG. 10B). Furthermore, end 964 may comprise both an undulated outer surface 965 and an undulated inner surface 966, for example using the composite tube joint 903 (see FIG. 10C).

Figure 11A:
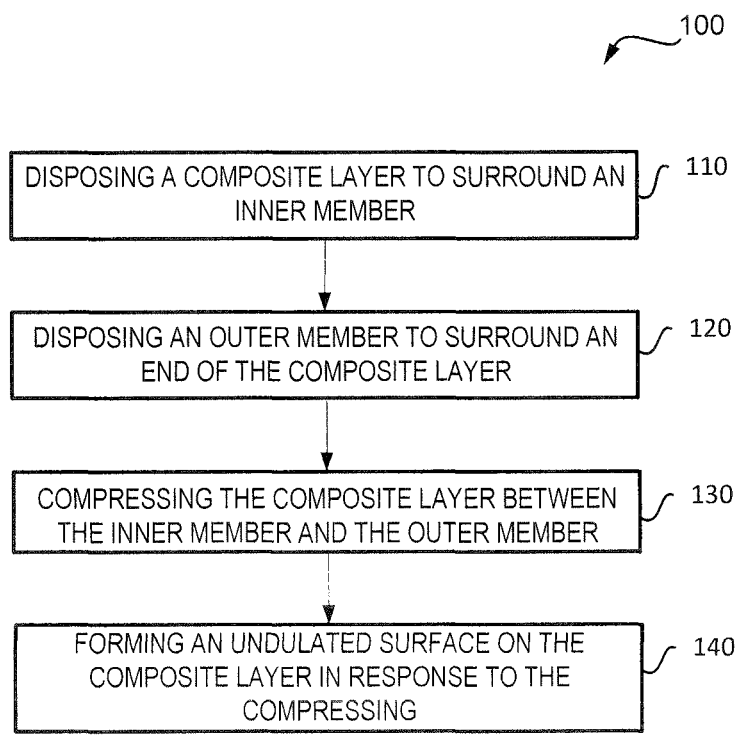
FIG. 11A, FIG. 11B, and FIG. 11C provide methods for forming a composite tube joint, in accordance with various embodiments.

With reference to FIG. 11A, a method 100 is illustrated for forming a composite tube joint, in accordance with various embodiments. Method 100 includes disposing a composite layer to surround an inner member (step 110). Method 100 includes disposing an outer member to surround an end of the composite layer (step 120). Method 100 includes compressing the composite layer between the inner member and the outer member (step 130). Method 100 includes forming an undulated surface on the composite layer in response to the compressing (step 140).

With combined reference to FIG. 9C and FIG. 11A, step 110 may include disposing one or more composite layers 990 to concentrically surround internal end part (also referred to herein as an inner member) 925. Step 120 may include disposing external end part (also referred to herein as an outer member) 935 to concentrically surround an end of composite layer 990. Step 130 may include compressing the one or more composite layers 990 between internal end part 925 and external end part 935. Step 140 may include forming an undulated surface (e.g., undulated outer surface 416 of FIG. 4A) on composite layer 990 in response to the compressing. The forming process at step 140 may include curing in the case of thermoset polymeric matrix. The forming process at step 140 may include solidification in the case of thermoplastic polymeric matrix.

Figure 11B:
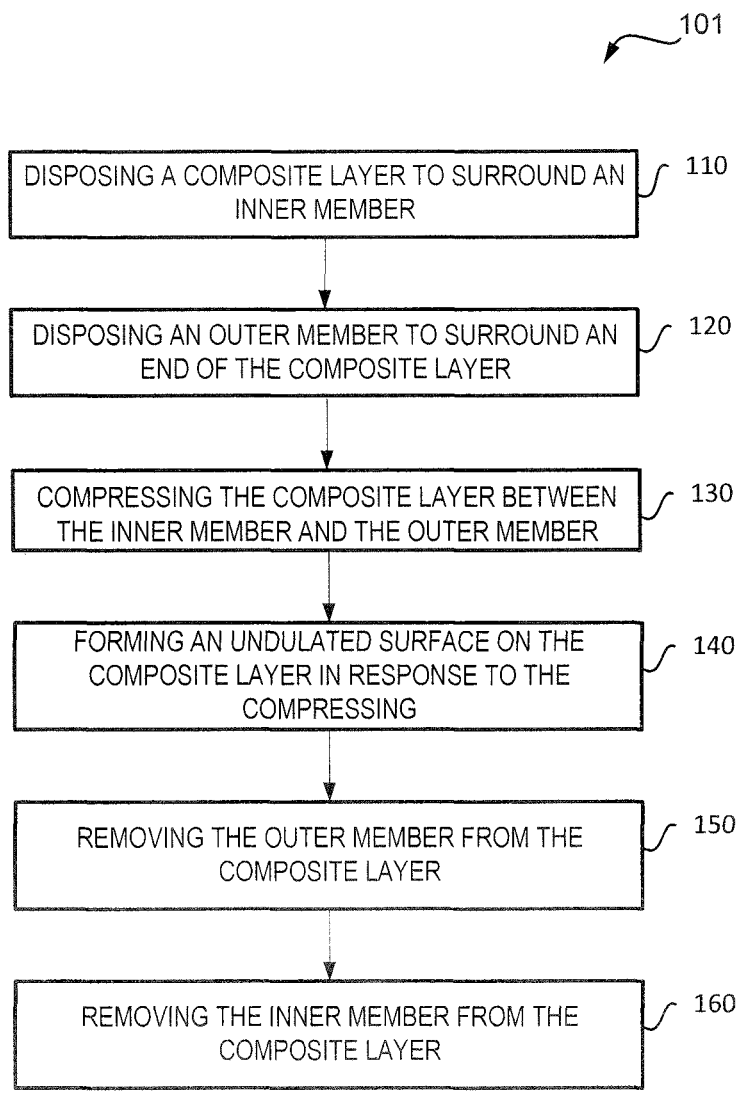

With reference to FIG. 11B, a method 101 is illustrated for forming a composite tube joint, in accordance with various embodiments. Method 101 may be similar to method 100 of FIG. 11A, except that method 101 further includes removing the outer member from the composite layer (step 150) and/or removing the inner member from the composite layer (step 160).

With combined reference to FIG. 9C and FIG. 11B, step 150 may include removing external end part 935 from composite layer 990. Step 160 may include removing internal end part 925 from composite layer 990.

Figure 11C:
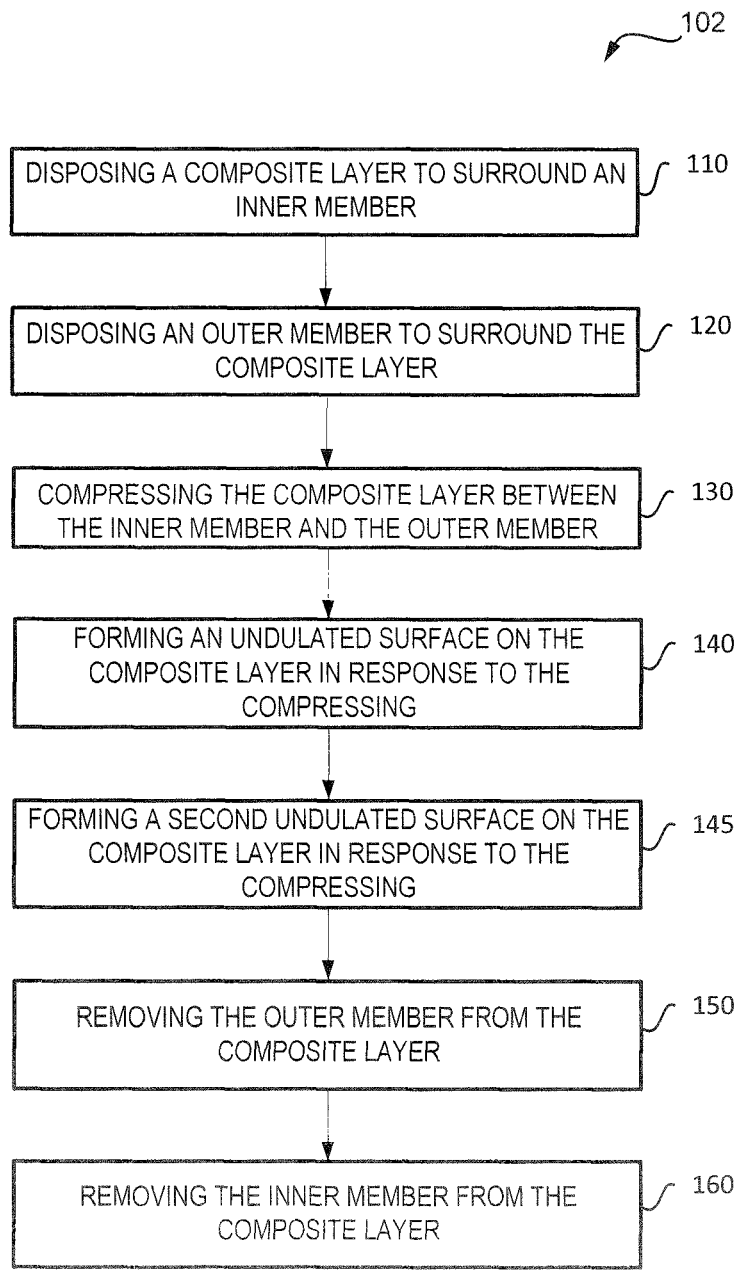

With reference to FIG. 11C, a method 102 is illustrated for forming a composite tube joint, in accordance with various embodiments. Method 102 may be similar to method 101 of FIG. 11B, except that method 102 further includes forming a second undulated surface on the composite layer in response to the compressing (step 145).

With combined reference to FIG. 9C and FIG. 11C, step 145 may include forming an undulated surface (e.g., undulated inner surface 412 of FIG. 4B and/or FIG. 4C) on composite layer 990 in response to the compressing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube joint, comprising:
    an end of a composite tube;
    an inner member disposed within the end, wherein an outer surface of the inner member has a complementary shape to an inner surface of the end;
    an outer member concentrically surrounding the end of the composite tube; and
    a first undulated surface configured to mitigate movement of the end relative to at least one of the inner member and the outer member;
    wherein the composite tube extends along a centerline axis, and
    the first undulated surface comprises a first plurality of undulations orientated perpendicular with respect to the centerline axis and a second plurality of undulations oriented at a non-zero angle with respect to to the first plurality of undulations.

2. The composite tube joint of claim 1, wherein the first undulated surface is disposed on the outer surface of the inner member, the first undulated surface configured to physically restrict the end from moving relative to the inner member.

3. The composite tube joint of claim 2, further comprising a second undulated surface disposed on an inner surface of the outer member, the second undulated surface configured to physically restrict the end from moving relative to the outer member.

4. The composite tube joint of claim 2, wherein the outer surface of the inner member engages the inner surface of the end.

5. The composite tube joint of claim 1, wherein the first undulated surface is disposed on an inner surface of the outer member, the first undulated surface configured to physically restrict the end from moving relative to the outer member.

6. The composite tube joint of claim 5, wherein the inner surface of the outer member engages an outer surface of the end.

7. The composite tube joint of claim 1, wherein the first plurality of undulations are oriented in a hoop direction.

8. The composite tube joint of claim 1, wherein the end is compressed between the outer member and the inner member, and the first undulated surface is configured to physically restrict the end from moving relative to at least one of the inner member and the outer member in response to a bending moment being applied to the composite tube joint.

9. The composite tube joint of claim 1, wherein the inner member comprises at least one of a first metallic material or a first composite material, and the outer member comprises at least one of a second metallic material or a second composite material.

10. The composite tube joint of claim 1, wherein the end comprises at least one of a flared end, a converging end, or a cylindrical end.

11. A composite tube joint, comprising:
- an end of a composite tube extending along a centerline axis;
- an inner member disposed within the end, wherein a shape of an outer surface of the inner member is complementary to an inner surface of the end;
- an outer member concentrically surrounding the end of the composite tube, wherein an inner surface of the outer member has a complementary shape to an outer surface of the end; and
- an undulated surface configured to mitigate movement of the end relative to at least one of the inner member and the outer member,
- wherein the undulated surface comprises a first plurality of undulations surrounding the centerline axis and oriented between one degree and eighty nine degrees with respect to a hoop direction.

12. The composite tube joint of claim 11, wherein the undulated surface comprises a second plurality of undulations surrounding the centerline axis and oriented at a second non-zero angle with respect to the hoop direction.

13. A method for forming a composite tube joint, comprising:
- disposing at least one composite layer to concentrically surround an inner member;
- disposing an outer member to concentrically surround an end of the composite layer;
- compressing the at least one composite layer between the inner member and the outer member; and
- forming an undulated surface on the composite layer in response to the compressing,
- wherein the undulated surface comprises a first plurality of undulations orientated perpendicular with respect to the centerline axis and a second plurality of undulations oriented at a non-zero angle with respect to the first plurality of undulations.

14. The method of claim 13, wherein the undulated surface is formed on an inner surface of the composite layer in response to an undulated outer surface of the inner member engaging the composite layer in response to the compressing.

15. The method of claim 13, wherein the undulated surface is formed on an outer surface of the composite layer in response to an undulated inner surface of the outer member engaging the composite layer in response to the compressing.

16. The method of claim 15, wherein a second undulated surface is formed on an inner surface of the composite layer in response to an undulated outer surface of the inner member engaging the composite layer in response to the compressing.

17. The method of claim 13, further comprising removing the outer member from the composite layer.

18. The method of claim 17, further comprising removing the inner member from the composite layer.

* * * * *